United States Patent [19]
Breyer

[11] 3,779,074
[45] Dec. 18, 1973

[54] APPARATUS FOR MEASURING TENSILE STRESSES IN CONTINUOUSLY FED WEBS OF MATERIAL

[75] Inventor: Eberhard Breyer, Herrenberg, Germany

[73] Assignee: Siemens Aktiengesellschaft, Munich, Germany

[22] Filed: Mar. 9, 1972

[21] Appl. No.: 233,120

[30] Foreign Application Priority Data
Mar. 10, 1971 Germany.................. P 21 11 527.5

[52] U.S. Cl. ............................................... 73/144
[51] Int. Cl. ............................................... G01l 5/08
[58] Field of Search............................. 73/143, 144

[56] References Cited
UNITED STATES PATENTS
2,552,189  5/1951  Kuehni................................. 73/144
3,201,985  8/1965  Williams............................... 73/143

*Primary Examiner*—Jerry W. Myracle
*Attorney*—High A. Chapin

[57]  ABSTRACT

A duct is disposed underneath the travelling web between the two guide rollers and extends across the width of the web. The duct has at least one row of pocket-like chambers connected to a blower so that an air cushion and thereby a static pressure develops between the duct and web. The pressure prevailing in each of the chambers which is proportional to the tensile stress in the strips of the web running over each chamber is measured by a measuring device.

9 Claims, 11 Drawing Figures

APPARATUS FOR MEASURING TENSILE STRESSES IN CONTINUOUSLY FED WEBS OF MATERIAL

FIELD OF THE INVENTION

This invention relates to an apparatus for measuring tensile stresses in continuously fed webs of material, and particularly, webs of material which are essentially impervious to gaseous media. Still more particularly, the invention relates to an apparatus for measuring tensile stresses in continuously fed webs of material utilizing a gas cushion.

BACKGROUND OF THE INVENTION

Apparatus have been known in which a gas cushion is used to deflect a travelling web passing between and over a pair of deflection guide rollers and a measuring device is used to measure the static pressure in the gas cushion. In this way, the overall tensile stress prevailing in the flexible continuously fed web of material and also the tensile stress distribution over the width of the web can be measured without contact. Depending on the tensile stress values determined, the control of the drive for the web of material can be influenced. Furthermore, the development of zonally different tensile stresses, which could easily lead to a break in the web of material or to various faults, can be counteracted by drying, cooling or other suitable treatment methods differently apportioned over the width.

It is also known that tensile stress differences can occur in a continuously fed web of material, for example, in the case of paper because of, among other things, different moisture content, and in the case of plastic or metal sheets, possibly because of differences in thickness. Further, it is only necessary in some cases to have slight stress differences lead to a considerable decrease in the quality of the end product in question. Therefore, only sufficiently sensitive devices offer the possibility of detecting at all the relatively slight differences in tensile stress which are caused by very small irregularities in the travelling web of material.

In a known arrangement for the measurement of web stresses, a feeler cylinder has been used to determine the web tension which cylinder has been movably supported and engaged by the web over an arc $\alpha$. As a consequence of this engagement, for a tension $Z$ in the web of material, the cylinder has been acted upon by a normal load $$N = 2 \cdot Z \cdot \sin \alpha/2.$$

This load $N$ can serve as the corresponding measurement value for the web tension, if the load $N$ is transmitted via the bearings of the cylinder to suitable pressure measuring instruments. Such a construction, however, does not satisfactorily react to localized differences in tension in the web.

In another known apparatus for detecting tensile stresses, several identical feeler devices are arranged side by side to detect the tensile stress in narrow strips of the web. Each of these devices comprises two support rollers disposed at a constant spacing and a nozzle arranged in between to act as a point device. Under the pressure of the air discharging from the nozzle of each individual feeler device against the sheet of material, an indentation of more or less depth, depending on the tension state of the sheet, is pressed into the sheet of material. In this way, a pressure value associated with the zonal tensile stress condition can be measured at each nozzle, corresponding to the depth of the indentation produced thereby.

This device, however, has the disadvantage that the pressure values measured at the nozzles as a function of the respective depth of the indentation are no absolute measure for the zonal tensile stresses actually prevailing at these points, as transverse stresses occur in the web in addition to the tension-dependent longitudinal stresses due to the indentation-forming point action of the nozzles. These transverse stresses are dependent on the nature of the material of the web and falsify the representation of the tensile stress condition.

Another known device has been one in which cold-rolled strip has been guided over two deflection rollers supported at a fixed preset distance from each other. In this device, a plate has been arranged underneath the web and transversally to the same at a small distance which precludes direct contact. The plate has been equipped with a number of depressions separated from each other by lengthwise partitions which depressions extend far into the space bounded by the web of material and the cylindrical surfaces of the deflection rollers. Compressed air has been blown into the depressions through air access canals which are arranged in a track or rib situated in the center of the plate and extend over the entire width of the device for the purpose of forming an air cushion within the labyrinth-shaped border ledges of the plate.

According to a stress analogy with a hollow body of thin-walled flexible material subjected to internal pressure, if the sheet of material is lifted under the pressure of the developing air cushion, an exactly arc-shaped curve is formed in the region between the border ledges close to the rollers with the radius $R = Z/P = \gamma \cdot \delta/P$ for a web subjected to the web tension $Z = \gamma \cdot \delta$, where $\delta$ is the thickness of the sheet of material and $\gamma$ the given tensile stress of the material in question. Accordingly, relatively low circular segments develop, depending on the prevailing web tension, as the largest portion of the discharge cross-section for the air escaping from the air cushion due to the lifting of the web by the air cushion occurs between the lateral borders and the surface of the plate. As a result, no uniform pressure distribution is generated, but only one that is essentially elliptical and decreases in steps from the inside to the outside. Because of the absence of lateral support of the web, a slight drooping of the web edges occurs due to the tension which then leads to the formation of bumps and, possibly, creases.

For this reason, the inflow of the compressed air through the air access canals to each of the depressions of the plate separated from each other by lengthwise partitions, is controlled via respective, separately and continuously controllable valves in such a manner that a uniform value is obtained over the entire width of the web for the lifting of the material web by the pressure of the air cushion. The valves are controlled by means of measuring devices which operate according to an inductive principle and by means of controls provided for each control valve. The air cushion pressures produced in the individual depressions of the plate by an appropriately controlled supply of air would, under these circumstances, be measurement values which correspond to the effectively prevailing tensile stresses of the web.

However, in view of suddenly occurring tensile stress surges, the controls must have PID behavior, which is indispensable for such cases, so that all interference quantities that are possible in starting up, accelerating and during continuous operation at high sheet velocities can be compensated without permanent deviations and sufficiently fast. Furthermore, in order to measure the tensile stress differences in a travelling web via an air cushion as simple pressure values, for example for a device with only seven zonal stress measurements, such requires seven sets of an inductive measuring device, a measuring amplifier and a control with a reference setting device.

Accordingly, it is an object of the invention to create a structurally simple apparatus which is completely insensitive to suddenly occurring tensile stress surges.

It is another object of the invention to provide an apparatus which provides measurement values of tensile stress which are extremely accurate and reproducible.

SUMMARY OF THE INVENTION

Briefly, the invention provides an apparatus including a duct which is positioned underneath a web of material to extend at least over the width of the web and which is subdivided by partitions into at least one row of pocket-like chambers and a means for supplying a medium to the duct to produce a gas cushion of uniform thickness between the web and the chambers. In addition, a number of measuring devices are provided each of which is connected to a respective chamber and the bottoms of the chambers are equipped with calibrated choke orifices through which the medium, preferably air, is held under constant pressure and, is fed to the chambers from the duct. In this way, the static pressure developed in the chambers covered over by the web lifts and deflects the web against the normal stress caused by the tension from the planed-off edges of the duct and the partitions facing the web to such an extent that a gap is generated between the web and the edges. Therefore, just the quantity of gaseous medium which is fed to the chambers according to the constant pressure head is able to flow off from the air cushion through this gap.

In order to measure stresses by means of a liquid medium, the duct is arranged in a tank below the surface of a medium free of suspended matterial and is connected to a centrifugal pump which draws the medium from the tank and feeds the medium to the duct at constant pressure.

The invention provides an apparatus in which a state of stable equilibrium is immediately established between the normal stress N, which depends on the deflection h and the tension Z of the web of material, and the static pressure of the medium developing in the chambers. Under constant conditions and pressure head of the fed-in medium, the static pressure can always be reproduced with extreme precision and is therefore a measurement value unequivocally corresponding to the web tension Z. This static pressure can be easily indicated or recorded in readable form with known pressure measuring devices, in order to measure the stress in continuously fed sheets of material.

According to another embodiment, two rows of chambers, separated by another partition are provided in the duct while front and rear top edges of the duct and the upper edge of the additional partition are set at an arcute angle opposite to the direction of travel of the web. By setting the edges of the duct and the partition at an angle, the same discharge conditions are, to a large extent, obtained for the medium stored in the chambers to flow from the gap generated between the web of material and the top edges of the chambers, in the direction of travel as well as against the direction of travel even at relatively high material velocity, under the influence of a boundary layer of air surrounding the web which is taken along by the moving surface of the material web. Thus, a uniform distribution of the static pressure developing in chambers of the duct which follow each other in the direction of motion is assured.

In another embodiment, the partitions for the respective chambers are arranged at an angle with respect to the side walls of the duct so that the chambers are of triangular or trapezoidal cross-sectional shape. In this embodiment, the chambers may be further subdivided by a partition extending transversely to the longitudinal axis of the duct. In this case, the quantity of air blown into each chamber is definitely dependent on the edge and is forced to flow out against the direction of travel of the web. This construction has the advantage of particularly simple manufacture and is suited for the measurement of stress of very flexible as well as highly elastic material web without the danger of forming tensile stress waves or of web flutter is slight transverse edge waves occur as the web runs through the measuring section.

In another embodiment, at least the adjacent chambers in the direction of the longitudinal axis of the duct are constructed as independent elements without common partition in such a manner that the sum of the widths ($b_1 + b_2$) of the chambers projected at any cross section in the respective plane of intersection is essentially constant.

Due to the construction of the chambers as independent elements without common partitions, the discharge of the stored-up medium is always assured over the entire rim, and therefore to all sides, if such an element is covered up. Therefore, a static pressure always develops in the air cushion between the material web and the chambers which is sufficient to permit the quantity of air blown into each chamber through the calibrated choke orifice to flow out through the gap which is self-adjusting according to the tensile stress.

In this construction, it may be advantageous, particularly if the apparatus is used for very flexible sheets of material, to provide the chambers with a partition transversely or transversely and longitudinally to the lengthwise axis of the duct. In this way, any unilateral flutter of the material web which may be the result of slight transversal waves that might possibly occur due to a tensile-stress asymmetry is reliably suppressed, as the discharge of the air is tied to the associated section of the rim through the subdivision of the chambers.

Thus, different zonal tensile stresses and the overall tension of a continuously travelling web of material of narrow width can be measured without additional control aids with the same accuracy as the maxium web width for the apparatus in question. Moreover, the formation of tensile stress waves propagating along the web are avoided even with very flexible sheets.

The advantages attainable by the invention consist in particular in that the tension of travelling materials webs are measured without mechanical transission elements and, therefore, without dead weight, i.e., without the weight of a measuring roller, as well as completely without inertia and friction, and even with a minimal stroke (which is the deflection of the web of material). The apparatus according to the invention is thus especially well suited as a measuring transmitter for all known static quick-acting regulators for the control of the tension of continuously travelling webs of material, provided these are only slightly or not at all pervious to air.

A further advantage is that the tension of a travelling material web is measured entirely without contact. Thus, for example, in the vicinity of treating equipment for wet end operations, neither contamination nor any detrimental effects of the equipment or of the medium used in conjunction therewith take place on the wet, sensitive surface of the travelling material web.

Furthermore, the apparatus according to the invention is able to operate at relatively low as well as at relatively high web tension with the same precision, if the optium conditions applicable for the desired measuring range are observed for the arrangement and operation of the equipment.

These and other objects and advantages of the invention will become more apparent from the following detailed description and appended claims taken in conjunction with the accompanying drawings in which:

DESCRIPTION OF THE PREFERRED EMBODIMENTS

Figure 1:
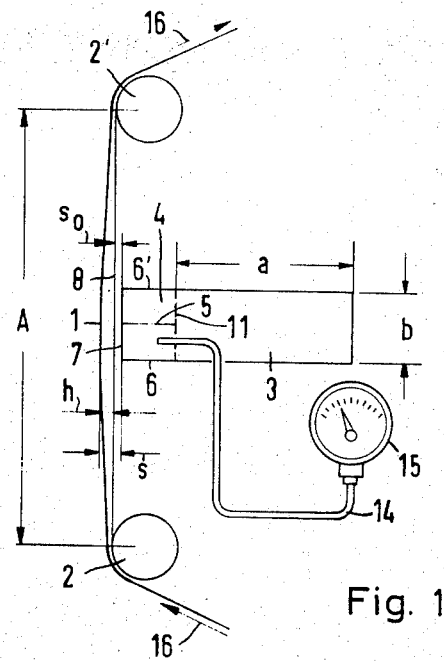
FIG. 1 illustrates a stress measuring apparatus according to the invention positioned adjacent a travelling web of material.
Figure 2:
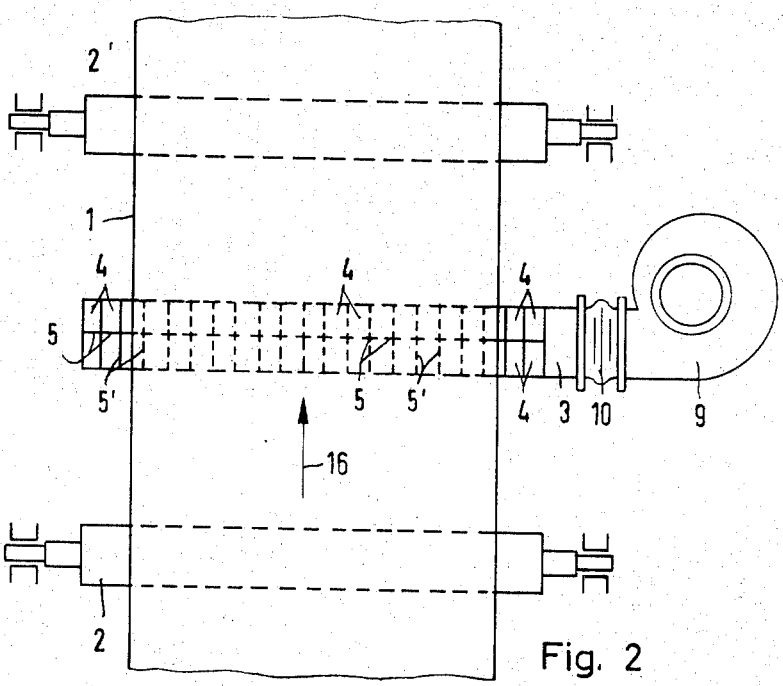
FIG. 2 illustrates a top view of the apparatus shown in FIG. 1.

Referring to FIGS. 1 and 2, a continuously fed web of material 1 is passed through a measuring section formed by two guide and deflection rollers 2 and 2' which are supported at a distance A from each other in order to obtain a measurement of the stress in the web. The direction of travel, or the path of the web 1 can be as desired, according to the situation for the individual installation, in all cases with normal to high web tension, where the weight of the web per square meter is less than 1 percent of the lowest stress still to be measured.

Only in the range of low web tension is it necessary, in order to obtain unfalsified measurement results in the stress measurement, to provide a vertical run for the material web in the region of the measuring section A so that the influence of the weight of the web on the tension measured by the apparatus is eliminated.

An air duct 3 is arranged in parallel between the two guide and deflection rollers 2 and 2' and underneath the web of material 1. The duct 3 is of constant width b and continuously tapered height a with a side facing the web 1 provided with two rows of pocket-like chambers 4. These chambers 4 are separated from each other by partitions 5 and 5' which extend lengthwise and transversely to the duct 3.

The top edge 7 of the front and rear rim 6 and 6' of the chambers 4 are planed off together with the partitions 5 and 5' so that the development of a gap $s$ of uniform width between the web of material and the top edge 7 is assured if the sheet is deflected.

The air duct 3 is advantageously adjusted underneath the web of material 1 in such a manner the planed-off top edges 7 of the chambers 4 just coincide with a plane connecting the cylindrical surfaces of the guide and deflection rollers 2 and 2' tangentially, or are spaced with respect to the plane by a base gap $s_0$. Under otherwise equal conditions, the apparatus is suited in the first case for measuring a higher range of stress, and in the second case for measuring a lower range.

The duct 3 is supplied with the air or gaseous medium that supports the web of material 1 by a high-pressure fan or an equivalent blower 9, which is connected to the duct 3 by resilient connection 10 in order to prevent vibrations in the apparatus. The pressure of the medium delivered into the duct 3 by the blower 9 is kept constant for the purpose of maintaining constant conditions for the stress measurement by means known per se, which are not described here in detail.

In order to obtain an apportioned supply of the air or the gaseous medium from the duct 3 to the chamber 4, the chambers 4 are closed off by a bottom 11 with a number of calibrated choke openings 12. The size and spacing of the choke openings 12, while meeting the continuity conditions, are chosen such that the jets of medium emanating from the openings 12 form a very uniform stream of low velocity within each chamber 4 which cannot exert an appreciable impulse on the web 1 passing over the chamber 4.

Figure 3:
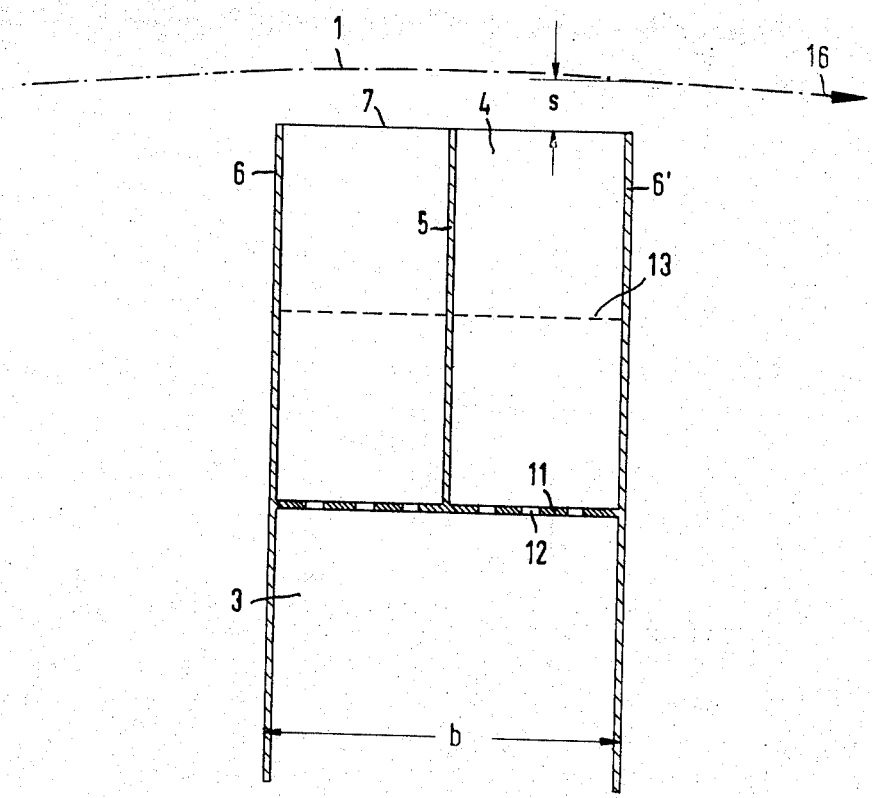
FIG. 3 illustrates a cross-sectional view of an air duct of the apparatus of FIG. 1.

A precise stress measurement can be achieved which becomes higher as the impulse of the jets of the medium emanating from the choke openings 12 on the web of material becomes lower. A screen 13, as shown in FIG. 3, is optionally placed in front of the choke openings 12 within the chambers 4 to resolve these jets so as to form a low velocity stream of medium as uniform as possible.

Because of the medium which is pushed from the duct 3 into the chambers 4, a static pressure is built up in the chambers 4 in the region covered by the web 1 against the normal stress N developed by the deflection of the web 1 for the given length A of the measuring section at the prevailing tension Z. The static pressure lifts the web 1 against the developing normal stress N so far from the upper edge 7 of the apparatus, that through the gap $s$ thus formed just that amount of medium can flow off which is passed at a constant pressure head from the duct 3 through the choke opeings 12 into the chambers 4.

The static pressure of the medium, corresponding here to the web tension Z, is measured in a simple manner via a measuring line 14, which is brought out from each chamber 4 about at the center of the web 1 (because of a slight pressure drop in the immediate vicinity of the web edges) by means of an appropriately calibrated precision manometer 15.

In order to avoid deposits at the calibrated choke openings 12, which might possibly be carried along by the air or gaseous medium delivered to the duct 3 by the blower 9 and which could potentially affect the results of the stress measurement of a travelling web of material, the medium in question is advantageously drawn in by the blower 9 through a preceding filter (not shown).

Figure 4:
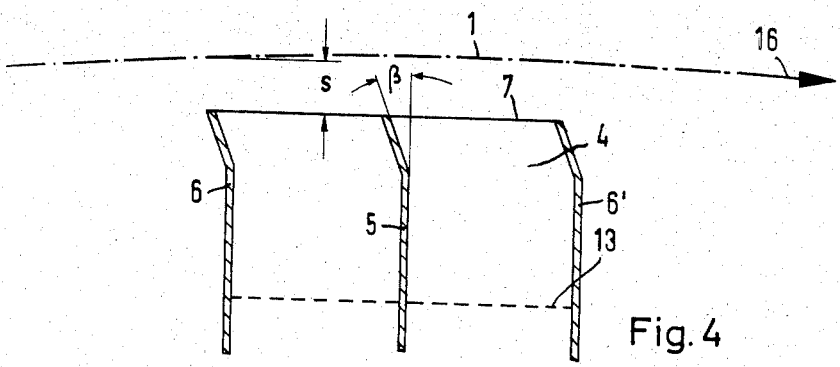
FIG. 4 illustrates a cross-sectional view of a modified air duct with a rim and a partition angled over.

A high running speed of the material web, the medium dammed up in the chambers 4 which supports the web can flow off under the influence of the boundary layer of air surrounding the web. This boundary layer is carried along at the surface of the web to a large extent in the direction of travel 16 of the web rather than against it. This can lead to small differences in the static pressure of the medium developing in two successive chambers 4. In order to prevent such an effect in the preferred stress range, the respective front and rear edge 6 and 6' as well as the partition 5 situated between the chambers are set as shown in FIG. 4 at an acute angle $\beta$ against the direction of travel 16 of the web of material 1.

At low running speed of the web of material, the angularity of the edges 6, 6' and partition 5 has the effect that the medium dammed up in the chambers 4 flows off under the developing static pressure to a greater extent not in the direction of travel 16 of the web of material but against it. At high running speed, especially in the range for which the setting of the edges 6 and 6' as well as of the partition 5 at the angle $\beta$ is provided, this latter effect is cancelled due to the oppositely directed boundary-layer effect of the web running at high speed.

The same discharge conditions, therefore, result again for the medium in as well as against the direction of travel 16 of the web 1. Thus, the desired uniform pressure distribution for the medium dammed up in the successive chambers 4 can also be achieved at high running speed of the web of material.

Figure 5:
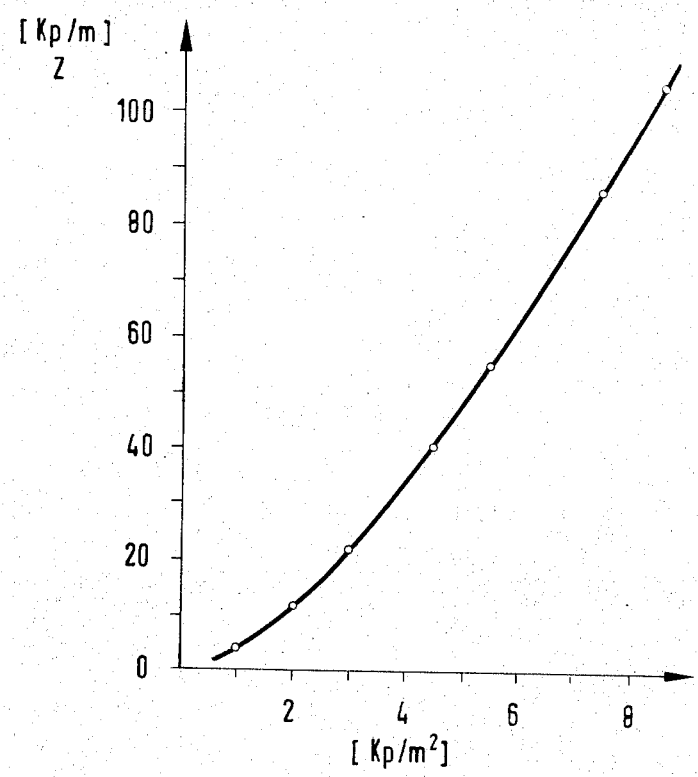
FIG. 5 graphically illustrates a curve of stress measurement over a stress range of 10 to 100 kp/m (approx. 0.55 to 5.5 lb/in.)

Referring to FIG. 5, a measurement diagram is shown of a constructed apparatus with a preferred measuring range of 10 to 100 kiloponds/meter (kp/m) of web tension. From this can be seen the extremely favorable course of the static pressure which, in each instance, corresponds to the web tensions of the medium dammed up in the chambers. From this, the advantageous application potential of the apparatus will be recognized.

Figure 6:
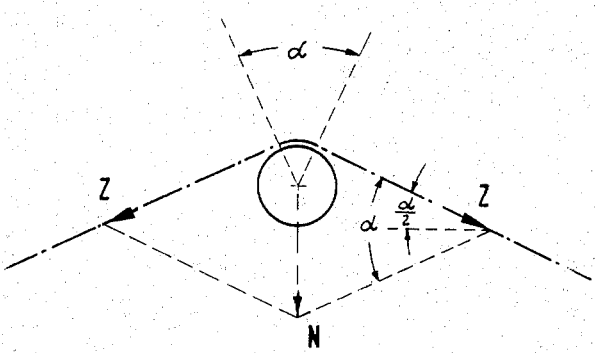
FIG. 6 schematically illustrates the force situation in a known feeler roller for the measurement of stress.

Referring to FIG. 6, where a movably mounted cylinder has been used to determine web tension, the tension $Z$ in the web under a normal load $N$ over an arc $\alpha$ is related to the load by the formula:

$$N = 2 \cdot Z \cdot \sin \alpha/2 .$$

Figure 7:
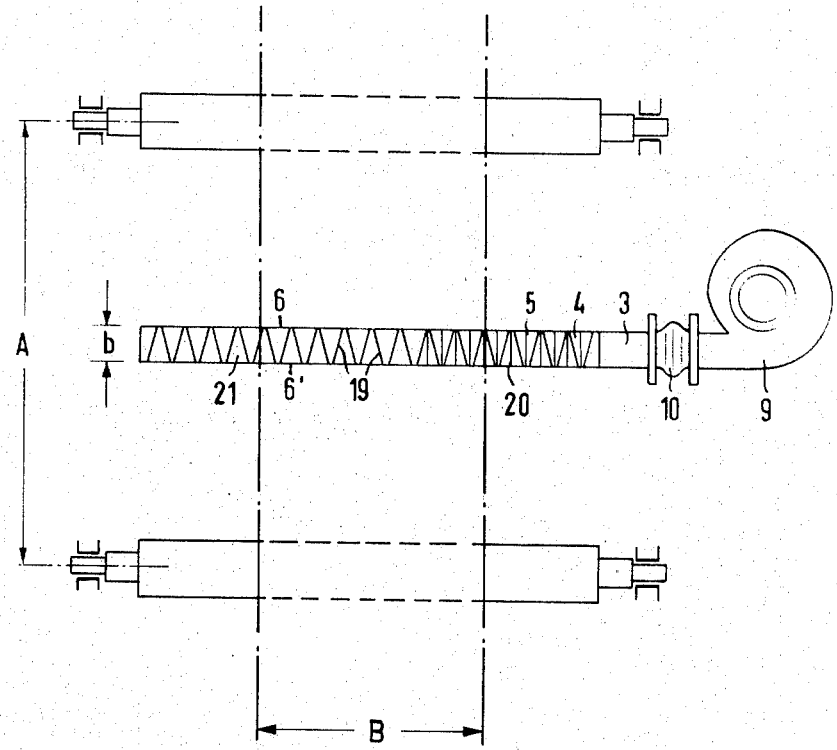
FIG. 7 illustrates a view of a duct having trapezoidal chambers.

Referring to FIG. 7, wherein like reference characters indicate like parts as above, partitions 18 extending in zig-zag shape are arranged between the walls 6, 6' of the duct 3 to form a series of chambers 21. The triangular to trapezoidal chambers 21 formed thereby may also be subdivided once more by an additional longitudinally extending partition 20, depending on the situation, without changing the characteristic sought.

Figure 8:
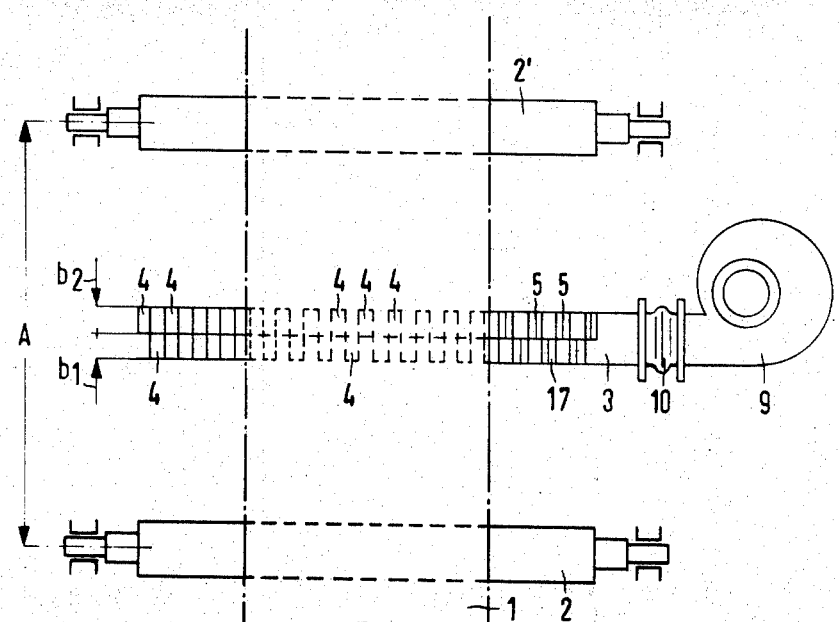
FIG. 8 illustrates a view of a duct having rectangular staggered chambers.

Referring to FIG. 8, wherein like reference characters indicate like parts as above, a series of chambers 4 of rectangular shape are positioned in mutually offset manner like the squares of the same color on a chess board. These chambers 4 therefore have no partitions in common. With planed-off top edges and rims, respectively, and equal width ($b_1 = b_2$) of the chambers 4, the same static pressure adjusts itself throughout for an appropriately apportioned air supply. This is accomplished by means of the calibrated holes in the bottom of the depressions in all chambers which are completely covered over by a travelling web of material with a tensile stress uniformly distributed over its width. This is because the web will be lifted from the planed-off top edge of the chambers only under this static pressure as a function of the tension, by such an amount that, through the gap $s$ thus formed along the edge of each chamber which is completely covered over by the web, just the amount of air which is blown from the duct 3 through the calibrated choke openings into each chamber can be discharged.

As is shown on the right-hand side of FIG. 8, the chambers 4, acting as independent elements, can also be halved by a partition 17. This construction permits any possibly occurring longitudinally directed tension waves, in the case of very flexible webs, to be suppressed due to the fact that the discharge of the air blown into each independent element always remains tied to the rim section associated with the same.

Figure 9:
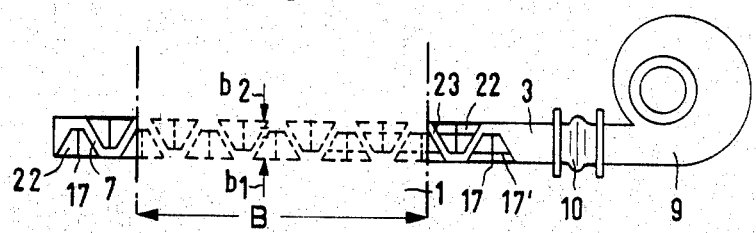
FIG. 9 illustrates a view of a duct with trapezoidal chambers.

Referring to FIG. 9, the side of the duct 3 facing the web of material can alternatively be equipped with trapezoidal, independently acting chambers 22 which are somewhat offset and are arranged with spaces 23 for the supply of air in such a manner that, at any longitudinal cross section through the apparatus, the sum of the widths $b_1 + b_2$ of the chambers projected in the plane of intersection, is always constant.

In order to achieve a discharge of the blown-in air that is strongly tied to the rim, the trapezoidal chambers, acting as independent elements, can be equipped with a partition 17. Also, as an added option, if the apparatus is used for material webs with a tendency to transverse edge waves, additional partions 17 can be provided which are set as shown.

The apparatus according to FIG. 8 is advantageously used if the given operational conditions make the realization of a large ratio of the web width B to duct width $b$, that is $B/b = B/(b_1 + b_2)$, appear desirable for the solution of the problem at hand.

Figure 10:
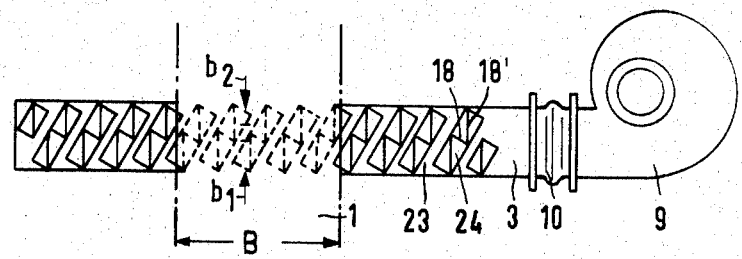
FIG. 10 illustrates a view of a duct with obliquely arranged rectangular chambers.

Referring to FIG. 10, the side of the duct 3 facing the web of material can also have rectangular, independently acting chambers 24. These chambers 24 are placed in a row at an angle and next to each other with spacings 23 in such a manner that at any longitudinal cross section through the apparatus, the sum of the lengths $b_1 + b_2$ of the chambers 24, acting as independent elements, projected in the plane of intersection, is again constant. This construction is suited particularly for small ratioes $B/b = B(b_1 + b_2)$, as will be seen clearly by comparing FIGS. 8 and 9. The obliquely placed chambers 24 may be subdivided by partitions 18 and, additionally, by further partitions 18' as above.

In the embodiments described, the supply of the quantity of air required for operation, which must be fed in with a larger or smaller pressure head, depending on the magnitude of the tensile stresses to be measured and which must be kept constant, is provided through an appropriately selected radial blower or high-pressure fan 9. The blower or fan 9 is connected to the duct 3 by means of a resilient connection 10 in order to prevent vibrations in the apparatus. Notwithstanding, the apparatus can, in some situations, also be supplied from an operational compressed-air system by using a suitable pressure-reducing valve; however, this is no longer economical as compared to a separate blower, in view of the quantities of air required and the usually employed low pressure head. Therefore, the use of a compressed air system is justified only under compelling circumstances.

Figure 11:
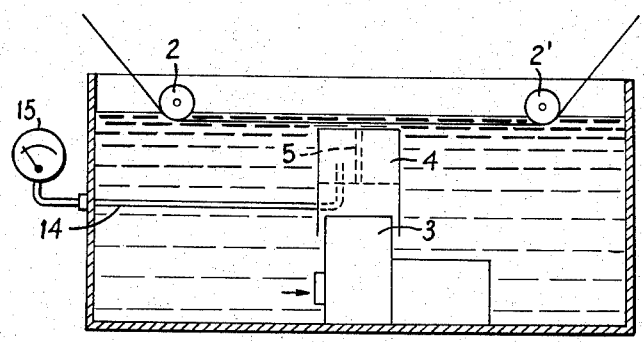
FIG. 11 illustrates a view of a duct using a liquid medium.

In lieu of a gaseous medium, a liquid medium can also be used for example, as shown in FIG. 11, wherein like reference characters indicate like parts as above. Here, the duct must be arranged in a tank below the liquid level, and a centrifugal pump with a motor 3 must be provided which draws the liquid from the tank and delivers it to the duct under constant pressure. The liquid must also be kept free from suspended matter, if necessary, by continuous filtering.

What is claimed is:

1. An apparatus for measuring tensile stress in a continuously travelling web of material comprising
   a duct adjacent the travelling web and extending across the width of the web, said duct having a plurality of partitions therein defining a plurality of pocket-like chambers in facing relation to the web, each said chamber having a bottom and a calibrated choke opening in said bottom communicating with said duct to receive a supply of gaseous medium therefrom
   a plurality of measuring devices, each said device being connected to a respective chamber to measure the static pressure therein as a measure of the tension in the web lying thereover, and
   means for supplying the gaseous medium to said duct to produce a gas cushion a uniform thickness between the web and said chambers.

2. An apparatus as set forth in claim 1 wherein said duct includes a pair of edges bounding said chambers and a further partition defining two rows of said chambers and wherein said edges and said further partition are disposed at an acute angle against the direction of travel of the web.

3. An apparatus as set forth in claim 1 wherein said partitions are disposed at an angle to define chambers of triangular cross-sectional shape.

4. An apparatus as set forth in claim 1 wherein said partitions are disposed at an angle to define chambers of trapezoidal cross-sectional shape.

5. An apparatus as set forth in claim 4 which further includes a further partition in each chamber extending transversely to the longitudinal axis of said duct.

6. An apparatus as set forth in claim 1 wherein adjacent chambers on one side of said duct are spaced apart, and the sum of the widths of said chambers on opposite sides of said duct in any cross-section is constant.

7. An apparatus as set forth in claim 6 wherein each chamber includes a partition disposed transversely or transversely and longitudinally of the longitudinal axis of said duct.

8. An apparatus as set forth in claim 1 wherein said means is a blower.

9. In combination,
   a tank having a liquid medium free of suspended matter therein;
   an apparatus for measuring tensile stress in a continuously travelling web of material including a duct adjacent the travelling web and extending across the width of the web, said duct being disposed in said tank below the surface of the liquid medium and having a plurality of partitions therein defining a plurality of pocket-like chambers in facing relation to the web, each said chamber having a bottom and a calibrated choke opening in said bottom communicating with saud duct to receive a supply of liquid medium therefrom to produce a liquid cushion of uniform thickness between the web and said chambers, and a plurality of measuring devices, each said device being connected to a respective chamber to measure the static pressure therein as a measure of the tension in the web lying thereover; and
   a centrifugal pump connected to said duct and said tank for drawing the liquid medium from said tank and for feeding the drawn liquid medium to said duct under constant pressure.

* * * * *